United States Patent [19]
Yamasaki et al.

[11] Patent Number: 5,502,699
[45] Date of Patent: Mar. 26, 1996

[54] DISC REPRODUCTION APPARATUS

[75] Inventors: Yoshimori Yamasaki, Kanagawa;
Takayoshi Chiba; Hideki Kobunaya,
both of Tokyo; Yutaka Ishikawa,
Kanagawa, all of Japan

[73] Assignees: Sony Corporation; NEC Corporation,
both of Tokyo, Japan

[21] Appl. No.: 240,850

[22] Filed: May 11, 1994

[30]    Foreign Application Priority Data

May 14, 1993  [JP]  Japan .................... 5-136742

[51] Int. Cl.$^6$ .............................. G11B 7/013; G11B 5/09
[52] U.S. Cl. .................................. 369/48; 360/48
[58] Field of Search ................... 369/48, 47, 54, 369/58, 124, 32; 360/48

[56]            References Cited

U.S. PATENT DOCUMENTS 4,603,411  7/1986  Sugiyama et al. .................. 369/47
4,620,300  10/1986  Ogawa ................................. 369/47
4,663,752  5/1987  Kakuse et al. ....................... 369/54

Primary Examiner—Georgia Y. Epps
Assistant Examiner—P. W. Huber
Attorney, Agent, or Firm—William S. Frommer

[57]            ABSTRACT

In a disc reproduction apparatus 1 for reproducing information signals from a disc recording medium whereon a first synchronization pattern is formed on a recording track in predetermined cycles and more than one second synchronization pattern with fewer bits than the first synchronization pattern which has been recorded between first synchronization patterns adjacent to each other, second synchronization patterns are detected without fail and highly accurately. The timing of a second synchronization pattern detecting means 7 for fetching the reproduction signal R is made variable through making the window width of window signal WIN variable based on the results (F1 and F2) of the detection of first and second synchronization patterns by first and second synchronization pattern detecting means 6 and 7.

11 Claims, 4 Drawing Sheets

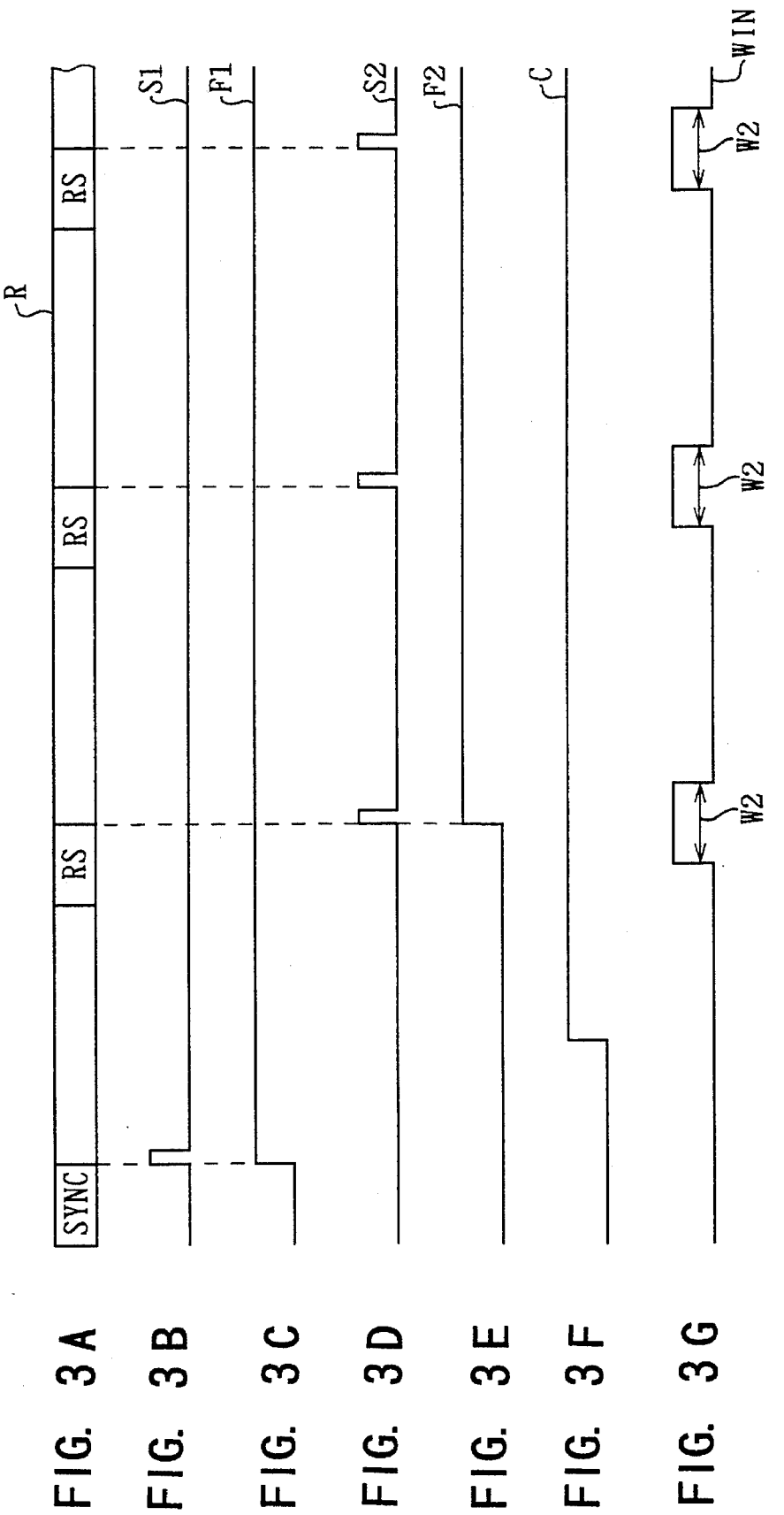

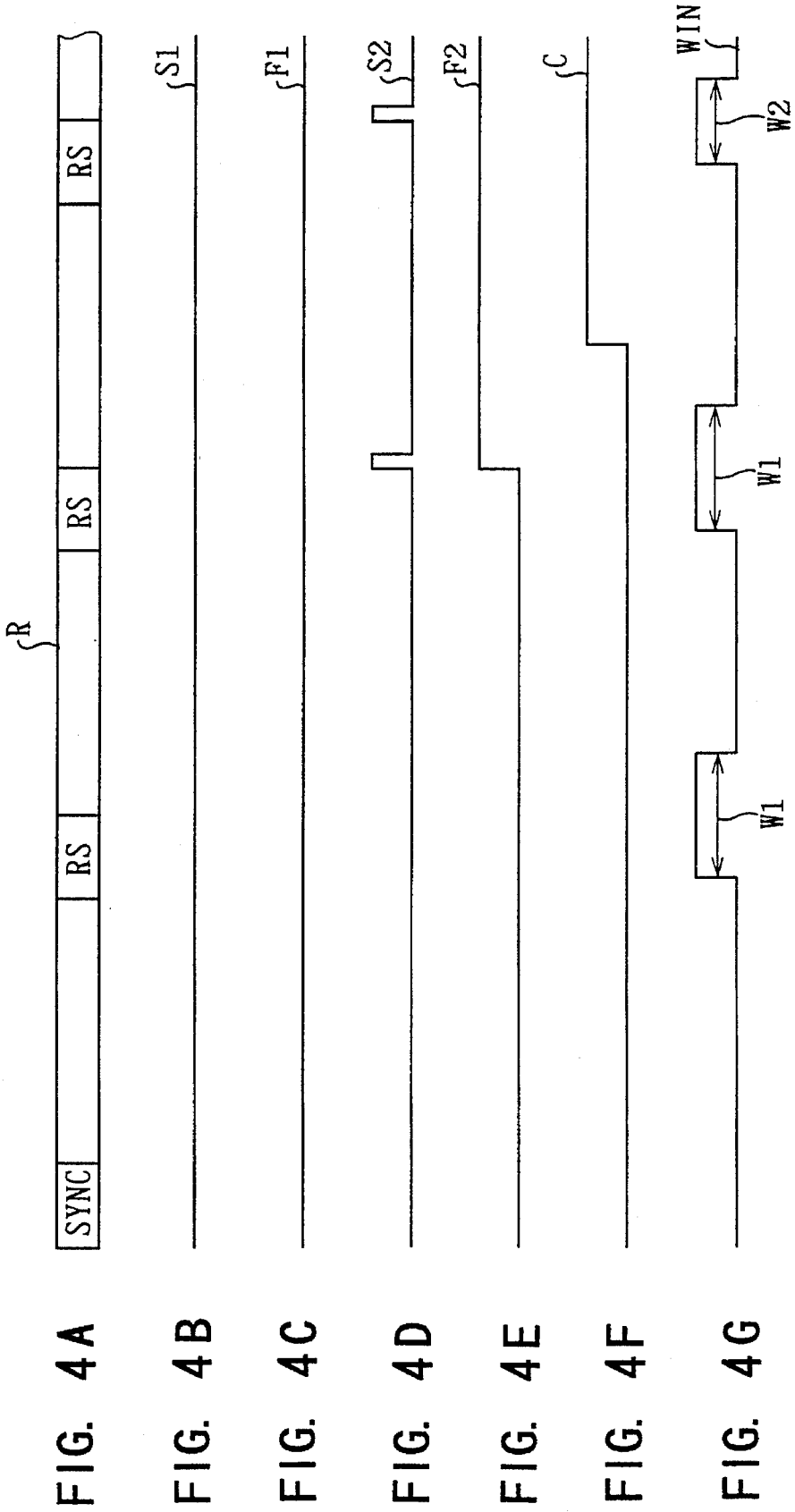

DISC REPRODUCTION APPARATUS

BACKGROUND OF THE INVENTION

1. Field of the Invention

This invention relates to a disc reproduction apparatus, and more particularly, to magneto-optical disc units for reproducing information recorded on a magneto-optical disc.

2. Description of the Related Art

In a conventional magneto-optical disc unit, desired data can usually be recorded or reproduced based on a synchronization pattern recorded on a magneto-optical disc in predetermined cycles. That is, as shown in FIGS. 1A and 1B, the recording area of the magneto-optical disc is divided radially into sectors, each of which has a record of identification data ID (FIG. 1A) consisting of position information, such as recording track information and sector information, at the head and a record of desired data in the subsequent area.

A three-byte first synchronization pattern (SYNC) is recorded in this magneto-optical disc at the beginning and one-byte second synchronization patterns (RS) is recorded in this magneto-optical disc in predetermined cycles (or at intervals of tens of bytes), as shown in FIG. 1B. In this way, the magneto-optical disc unit effects what is called "byte synchronization" by finding the beginning of each single byte and fetching data in byte units based on this first synchronization patter (SYNC). Moreover, subsequent second synchronization patterns (RS) are detected in sequence based on this first synchronization pattern (SYNC), and the byte synchronization is corrected based on the result of detecting these second synchronization patterns (RS).

Thus, the byte synchronization difference is corrected based on the second synchronization pattern (RS), and desired data is recorded or reproduced without fail. For this, the magneto-optical disc unit generates a specified window signal based on the first synchronization pattern (SYNC) and selectively fetches a reproduction signal based on the window signal to obtain the second synchronization patterns (RS) in sequence.

When the second synchronization pattern (RS) is detected, the detection of errors in the second synchronization pattern due to a defect on the magneto-optical disc, etc., may be reduced if the window width of the window signal is narrowed and the recording density increased. However, once the window width is narrowed, occasions may arise in which the second synchronization pattern (RS) cannot be detected if time-axial fluctuation occurs in the reproduction signal due to jitter, etc.

SUMMARY OF THE INVENTION

In view of the foregoing, an object of this invention is to provide a disc reproduction apparatus capable of detecting a second synchronization pattern accurately and without fail.

The foregoing object and other objects of the invention have been achieved by the provision of a disc reproduction apparatus 1, which reproduces an information signal from a disc recording medium 2 whereon first synchronization patterns (SYNC) are formed along a recording track in predetermined cycles. A plural second synchronization pattern (RS) with fewer bits than the first synchronization pattern (SYNC) are also recorded between those adjoining first synchronization patterns (SYNC), the disc reproduction apparatus 1 comprising: a reproducing means 4 for obtaining a reproduction signal (R) from the disc recording medium 2; a first synchronization pattern detecting means 6 for detecting a first synchronization pattern (SYNC) from the reproduction signal (R); a second synchronization pattern detecting means 7 for fetching a reproduction signal (R) based on a specified window signal (WIN) and detecting a second synchronization pattern (RS) from the fetched reproduction signal (R); window signal generating means 10, 11, 12, 13, and 14 for generating a window signal (WIN) whose window width varies based on the result (F1 or F2) of detection by the first or second synchronization pattern detecting means 6 or 7; and a demodulating means 5 for demodulating the information signal from the reproduction signal (R) based the detection results S1 and S2 of the first and second synchronization pattern detecting means 6 and 7.

Moreover, according to this invention, in the disc reproduction apparatus 1, position information is recorded in the disc recording medium 2 for each of the plurality of first synchronization patterns (SYNC), and the window signal generating means 10, 11, 12, 13, and 14 comprises a first window signal generator 13 for generating the first window signal WIN1 of the first window width W1 based on position information obtained from reproduction signal R, a second window signal generator 14 for generating a second window signal WIN2 having a window width narrower than the first window signal WIN1 based on the result (S1 and S2) of detection by the first and second synchronization pattern detecting means 6 and 7, and a window signal switching circuit 12 for supplying the first window signal WIN1 and second window signal WIN2 selectively to the second synchronization pattern detecting means 7 based on the result of detection by the first and second synchronization pattern detecting means 6 and 7.

Moreover, in the disc reproduction apparatus 1, position information is recorded in the disc recording medium for each of the plurality of first synchronization patterns, and the window signal generating means comprises a first window signal generator for generating a first window signal of a first window width based on position information obtained from a reproduction signal, a second window signal generator for generating at least second and third window signals narrower in window width than the first window signal based on the result of detection by the first and second synchronization pattern detecting means, and a window signal switching circuit for supplying the first, second, and third window signals selectively to the second synchronization pattern detecting means based on the result of detection by the first and second synchronization pattern detecting means.

According to this invention, it is enabled to detect synchronization pattern RS without fail and highly accurately because the window width of the window signal WIN is made variable based on the results (F1 and F2) of the detection of the first and second synchronization patterns SYNC and RS by the first and second synchronization pattern detecting means 6 and 7 and also the second synchronization pattern detecting means 7 making the timing of fetching the reproduction signal R variable.

As described above, this invention enables provision of a disc reproduction apparatus to be capable of detecting second synchronization patterns without fail and highly accurately by detecting second synchronization patterns because of making the window widths of window signals variable based on the detection status of first or second synchronization patterns by first and second synchronization pattern detecting means.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 3A to 3G are signal waveform charts to explain the behavior of the magneto-optical disc unit; and FIGS. 4A to 4G are signal waveform charts to explain the behavior of the magneto-optical disc unit if a first synchronization pattern cannot be detected.

DETAILED DESCRIPTION OF THE EMBODIMENT

Figures 1A, 1B:
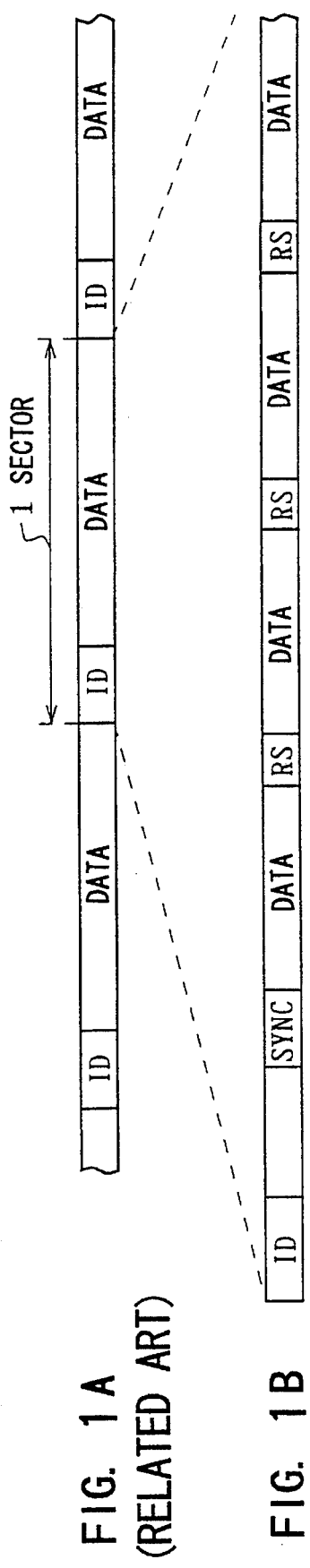
FIGS. 1A and 1B are schematic diagrams of arrays of synchronization patterns on a magneto-optical disc.
Figure 2:
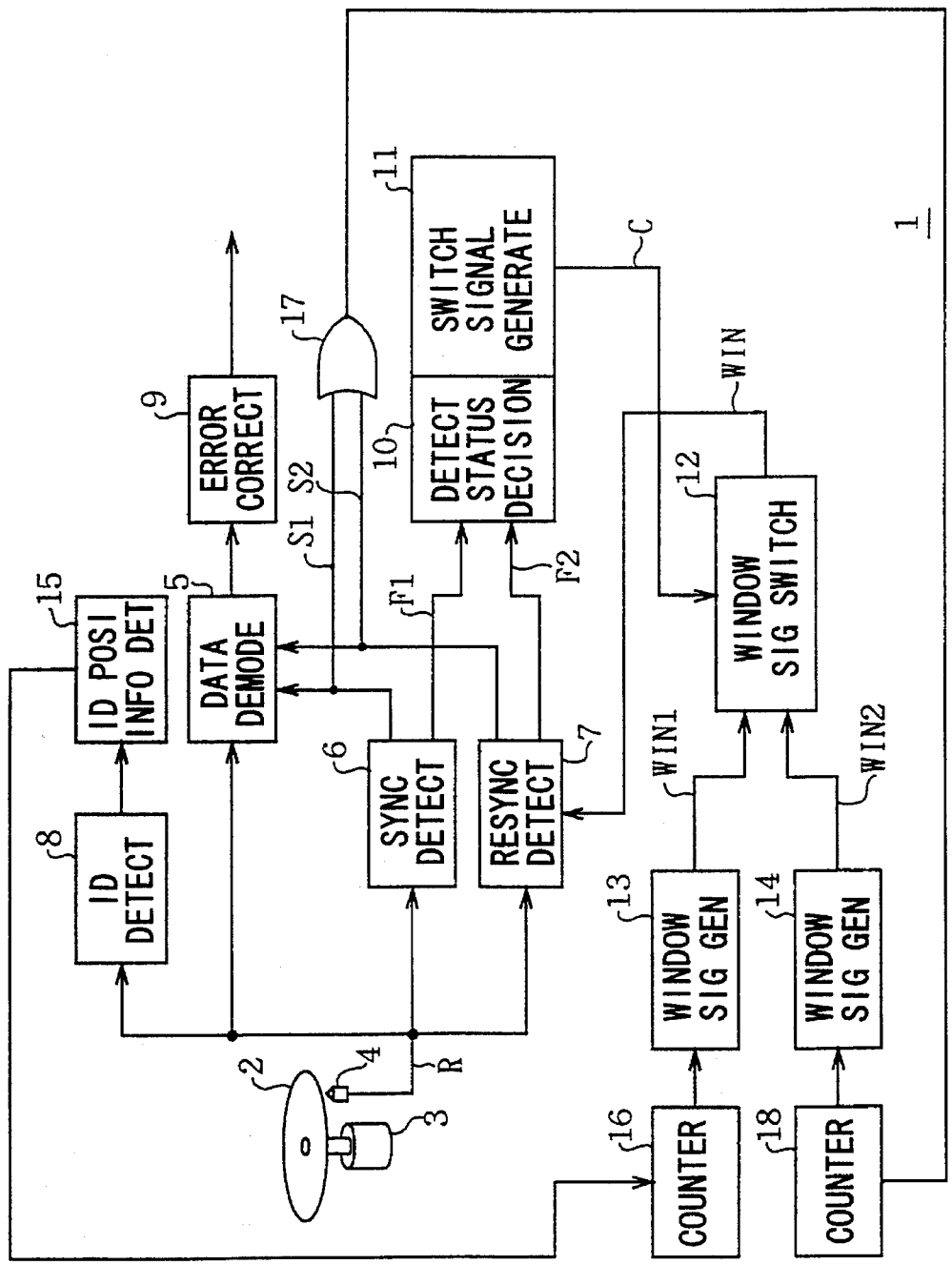
FIG. 2 is a block diagram of a magneto-optical disc unit according to the embodiment of this invention.

Preferred embodiments of this invention will be described with reference to the accompanying drawings:

FIG. 2 shows the overall configuration of a magneto-optical disc unit 1, which reproduces data recorded on a magneto-optical disc 2. That is, the magneto-optical disc unit 1 drives a spindle motor 3 to rotate the magneto-optical disc 2 at a specified rotational speed, so that in the magneto-optical disc unit 1, a light beam is emitted from an optical pickup 4 upon the magneto-optical disc 2 by which the reflected light is received, thus detecting a reproduction signal from information recorded on the magneto-optical disc 2. The reproduction signal is amplified and binarized in a specified signal processor and the resulting reproduction data R (FIG. 3A) is output to a data demodulator 5, a sync detector 6, a resync detector 7, and an ID detector 8.

The sync detector 6 compares a specified sync detection pattern with continuously supplied reproduction data R in sequence, thus detecting the first synchronization pattern SYNC from reproduction data R. The sync detector 6 then generates a sync detection pulse signal S1 (FIG. 3B), whose signal level goes high with the detection timing of the first synchronization pattern SYNC and outputs a sync detection signal S1 to the data demodulator 5.

The data demodulator 5 performs sequential signal processing on reproduction data R byte-synchronously based on the sync detection signal S1. Reproduction data R demodulated as a result of this processing is corrected for errors in an error corrector 9, then sent to an external host computer (not illustrated), etc. When this first synchronization pattern SYNC is detected, the sync detector 6 sets the level of the specified sync detection flag F1 (FIG. 3C) to high and outputs the SYNC detection flag F1 to the detection status decision apparatus 10.

The resync detector 7 detects a second synchronization pattern RS by comparing reproduction data R supplied continuously while the signal level of the window signal WIN (FIG. 3G) is high with a specified resync detection pattern. The resync detector 7 then generates the resync detection signal S2 (FIG. 3D), whose signal level goes high with the detection timing of the second synchronization pattern RS, and outputs the resync detection signal S2 to the data demodulator 5.

The data demodulator 5 corrects a signal processing timing based on the resync detection signal S2, thereby correcting byte synchronization. Moreover, when the second synchronization pattern RS is detected, the resync detector 7 sets the level of the specified resync detection flag F2 (FIG. 3E) to high and outputs this RESYNC detection flag F2 to the detection status decision apparatus 10.

The detection status decision apparatus 10 consists of arithmetic processing circuits, which judge the detection status of the first and second synchronization patterns SYNC and RS based on the input sync detection flag F1 and resync detection flag F2. When the first and second synchronization patterns SYNC and RS are detected correctly, the detection status decision apparatus 10 switches the window signal WIN to a narrower window width. That is, the detection status decision apparatus 10 switches the level of the switch signal C (FIG. 3F) to high by controlling the switch signal generator 11 when the sync detection flag F1 or resync detection flag F2 goes high.

Correspondingly, the window signal switching circuit 12 selects either the first window signal WIN1 from the window signal generator 13 or the second window signal WIN2 from the window signal generator 14 and outputs selected output to the resync detector 7 as a window signal WIN. For this embodiment, for example, when the signal level of the switch signal C goes high, the window signal switching circuit 12 selects and outputs a second window signal WIN2 whose window width is narrower than that of the first window signal WIN1.

The window signal generator 13 generates the first window signal WIN1, whose signal level goes high during period W1 (for two bytes being respectively at the front and the rear) for a one-byte second synchronization pattern RS, for example. The first window signal WIN1 is generated so that its signal level should go high at the timing of the occurrence of the leading second synchronization pattern RS subsequent to the first synchronization pattern SYNC and the sequential occurrence of the subsequent second synchronization pattern RS based on the position of identification data ID.

In practice, the generation timing of the window signal WIN1 is normally obtained based on count data from a counter 16, which starts counting from the timing of identification data ID obtained as a result of inputting identification data ID, detected from reproduction data R in the ID detector 8, to the ID position detector 15.

The window signal generator 14 generates a second window signal WIN2, whose signal level is high during period W2 for one byte and whose window width is narrower than that of the first window signal WIN1, for example. The second window signal WIN2 is generated to rise at the timing of the occurrence of the second synchronization pattern RS next to the timing of the first synchronization pattern SYNC or second synchronization pattern RS being detected.

In practice, generation timing of the second window signal WIN2 is determined by an OR circuit 17, which finds the logical add of the sync detection signal S1 or resync detection signal S2, and is obtained based on count data from the counter 18, which starts counting from the timing of the sync detection signal S1 or resync detection signal S2. With this embodiment, control of the window width by the window signal switching circuit 12 is reset in record units delimited by the first synchronization pattern SYNC, and the window signal WIN1, whose window width is greater, is first selected.

As described above in reference to FIGS. 3A to 3G, in the above composition, the detection status decision apparatus 10 controls the switch signal generator 11 so that the sync detection flag F1 goes high when the first synchronization pattern SYNC is correctly detected (FIGS. 3A and 3B), thus setting the signal level of the switch signal C to high (FIG. 3F).

Consequently, the window signal switching circuit 12 selects and outputs a second window signal WIN2 narrower in window width. Accordingly, the resync detector 7 detects the second synchronization pattern RS based on the second window signal WIN2 narrower in window width. Thereupon, erroneous detection in the second synchronization pattern RS due to defects on the magneto-optical disc 2 can be reduced and the second synchronization pattern RS can be detected highly accurately.

In contrast, if the first synchronization pattern SYNC cannot be detected as shown in FIGS. 4A to 4G, the detection status decision apparatus 10 maintains the signal level of the switch signal C low by controlling the switch signal generator 11 (FIG. 4F).

Consequently, the window signal switching circuit 12 selects and outputs the first window signal WIN1 (FIG. 4G) wider in window width. Accordingly, the resync detector 7 detects the second synchronization pattern RS based on the first window signal WIN1 wider in window width. Thereupon, the second synchronization pattern RS can be detected surely even if time-axis fluctuation occurs in reproduction signals because of jitter, etc., in the magneto-optical disc 2.

When the second synchronization patterns RS is detected in the first window signal WIN1 wider in window width, the resync detection flag F2 goes high (FIG. 4E), and the detection status decision apparatus 10 controls the switch signal generator 11 to narrow the window width and sets the signal level of the switch signal C to high (FIG. 4F).

Consequently, the window signal switching circuit 12 selects and outputs a second window signal WIN2 narrower in window width. Accordingly, the resync detector 7 detects the second synchronization pattern RS based on the second window signal WIN2 narrower in window width, thus enabling the second synchronization pattern RS to be detected highly accurately.

If the second synchronization pattern RS cannot be detected with the first window signal WIN1 wider in window width, the resync detection flag F2 is kept low (FIG. 4E). Thus, the resync detector 7 continues detecting the second synchronization pattern RS based on the first window signal WIN1 wider in window width.

The composition described above enables the second synchronization pattern RS to be detected without fail and highly accurately by detecting a subsequent second synchronization pattern RS based on the window signal WIN1 wider in window width if the first synchronization pattern SYNC or second synchronization pattern RS cannot be detected, or by detecting a subsequent second synchronization pattern RS based on the window signal WIN2 narrower in window width when the first synchronization pattern SYNC or second synchronization pattern RS has been detected.

The above-described embodiment have dealt with a case where the window width is changed in two steps. However, this invention is not limited to this embodiment, but the window width may be changed in three or more steps if necessary and may also be made continuously variable. In this connection, in a case where the window width is to be changed in three or more steps, a second synchronization pattern can be detected with even higher certainty and even higher accuracy if the window width is changed gradually based on the detection status of the first or second synchronization pattern.

Again, the above-described embodiment have dealt with a case where subsequent second synchronization patterns are detected based on a window signal narrower in window width once a first or second synchronization pattern has been detected. However, this invention is not limited to this case, but subsequent second synchronization patterns may be detected based on a window signal narrower in window width when a first synchronization pattern and a second synchronization pattern have been detected continually as many times as specified.

Furthermore, the above-described embodiment have dealt with a case where window width is controlled to narrow based on the detection status of a first synchronization pattern and a second synchronization pattern in detecting a second synchronization pattern. Yet, if a second synchronization pattern cannot be detected using so narrow a window width, control may be exercised to detect a second synchronization pattern again using a wider window width, instead of the above. Also, control itself may be exercised continuously over more than one recording unit, beyond one recording unit delimited by first synchronization patterns.

Furthermore, the above-described embodiment have dealt with a case where the wider window width is set to two bytes and the narrower window width is set to one byte. However, window width is not limited to these instances, but may be selected variously, and may even be made variable, if necessary.

Still furthermore, the above-described embodiment have dealt with a case where this invention is applied to a magneto-optical disc unit. However, this invention is not limited to this case, but can be widely applied to disc reproduction apparatuses wherein a plurality of second synchronization patters are distributed between first synchronization patterns and recorded data is reproduced based on those first and second synchronization patterns.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A disc reproduction apparatus for reproducing an information signal from a disc recording medium on which a first synchronization pattern is formed along a recording track in predetermined cycles, and more than one second synchronization pattern with fewer bits than said first synchronization pattern are formed between said first synchronization patterns adjacent to each other, comprising:

reproducing means for obtaining a reproduction signal from said disc recording medium;

first synchronization pattern detecting means for detecting said first synchronization pattern from said reproduction signal;

second synchronization pattern detecting means for fetching said reproduction signal based on a specified window signal and detecting said second synchronization pattern from said fetched reproduction signal;

window signal generating means for generating said window signal whose window width changes based on the result of detection by said first or second synchronization pattern detecting means; and demodulating means for demodulating said information signal from said reproduction signal based on the result of detection by said first and second synchronization pattern detecting means.

2. The disc reproduction apparatus as set forth in claim 1, wherein:

position information for each of said plurality of first synchronization patterns are recorded on said disc recording medium; and said window signal generating means comprises;

a first window signal generator for generating a first window signal having a first window width based on said position information obtained from said reproduction signal, a second window signal generator for generating a second window signal having a window width narrower than said first window signal based on the result of detection by said first and second synchronization pattern detecting means, and a window signal switching circuit for supplying said first and second window signals selectively to said second synchronization pattern detecting means based on the result of detection by said first and second synchronization pattern detecting means.

3. The disc reproduction apparatus as set forth in claim 2, wherein:

said window signal switching circuit supplies said first window signal to said second synchronization pattern detecting means at the timing of said subsequent second synchronization pattern if said first synchronization pattern detecting means has failed to detect said first synchronization pattern and supplies said second window signal to said second synchronization pattern detecting means at the timing of said subsequent second synchronization pattern when said first synchronization pattern detecting means has succeeded in detecting said first synchronization pattern.

4. The disc reproduction apparatus as set forth in claim 3, wherein:

said window signal switching circuit supplies said second window signal to said second synchronization pattern detecting means at the timing of said subsequent second synchronization pattern when said second synchronization pattern detecting means has detected said second synchronization pattern.

5. The disc reproduction apparatus as set forth in claim 4, wherein:

said window signal switching circuit supplies said first window signal to said second synchronization pattern detecting means at the timing of said subsequent second synchronization pattern if said second synchronization pattern detecting means has failed to detect said second synchronization pattern.

6. The disc reproduction apparatus as set forth in claim 2, wherein:

said window signal switching circuit switches and controls said first or second window signal to be supplied to said second synchronization pattern detecting means in one recording unit delimited by said first synchronization patterns adjacent to each other.

7. The disc reproduction apparatus as set forth in claim 1, wherein:

position information for each of said plurality of first synchronization patterns are recorded on said disc recording medium; and said window signal generating means comprises;

a first window signal generator for generating a first window signal having a first window width based on said position information obtained from said reproduction signal, a second window signal generator for generating at least second and third window signals whose window widths become sequentially narrower than that of said first window signal based on the result of detection by said first and second synchronization pattern detecting means, and a window signal switching circuit for supplying said first, second, and third window signals selectively to said second synchronization pattern detecting means based on the result of detection by said first and second synchronization pattern detecting means.

8. The disc reproduction apparatus as set forth in claim 7, wherein:

said window signal switching circuit supplies said first window signal to said second synchronization pattern detecting means at the timing of said subsequent second synchronization pattern if said first synchronization pattern detecting means has failed to detect said first synchronization pattern and supplies said second window signal to said second synchronization pattern detecting means at the timing of said subsequent second synchronization pattern when said first synchronization pattern detecting means has succeeded in detecting said first synchronization pattern.

9. The disc reproduction apparatus as set forth in claim 8, wherein:

said window signal switching circuit supplies said second window signal to said second synchronization pattern detecting means at the timing of said subsequent second synchronization pattern when said second synchronization pattern detecting means has detected said second synchronization pattern and supplies said third window signal to said second synchronization pattern detecting means at the timing of said subsequent second synchronization pattern when said second synchronization pattern detecting means has detected said second synchronization pattern for the predetermined number of times.

10. The disc reproduction apparatus as set forth in claim 9, wherein:

said window signal switching circuit supplies said second or first window signal to said second synchronization pattern detecting means at the timing of said subsequent second synchronization pattern if said second synchronization pattern detecting means has failed to detect said second synchronization pattern with said third or second window signal.

11. The disc reproduction apparatus as set forth in claim 7, wherein:

said window signal switching circuit switches and controls said first, second, and third window signals to be supplied to said second synchronization pattern detecting means in one recording unit delimited by said first synchronization patterns adjacent to each other.

* * * * *